Oct. 16, 1934.  W. F. BISLEY  1,976,981
MOTOR FOR SELF STARTING ELECTRIC CLOCKS
Filed June 5, 1933  2 Sheets-Sheet 1
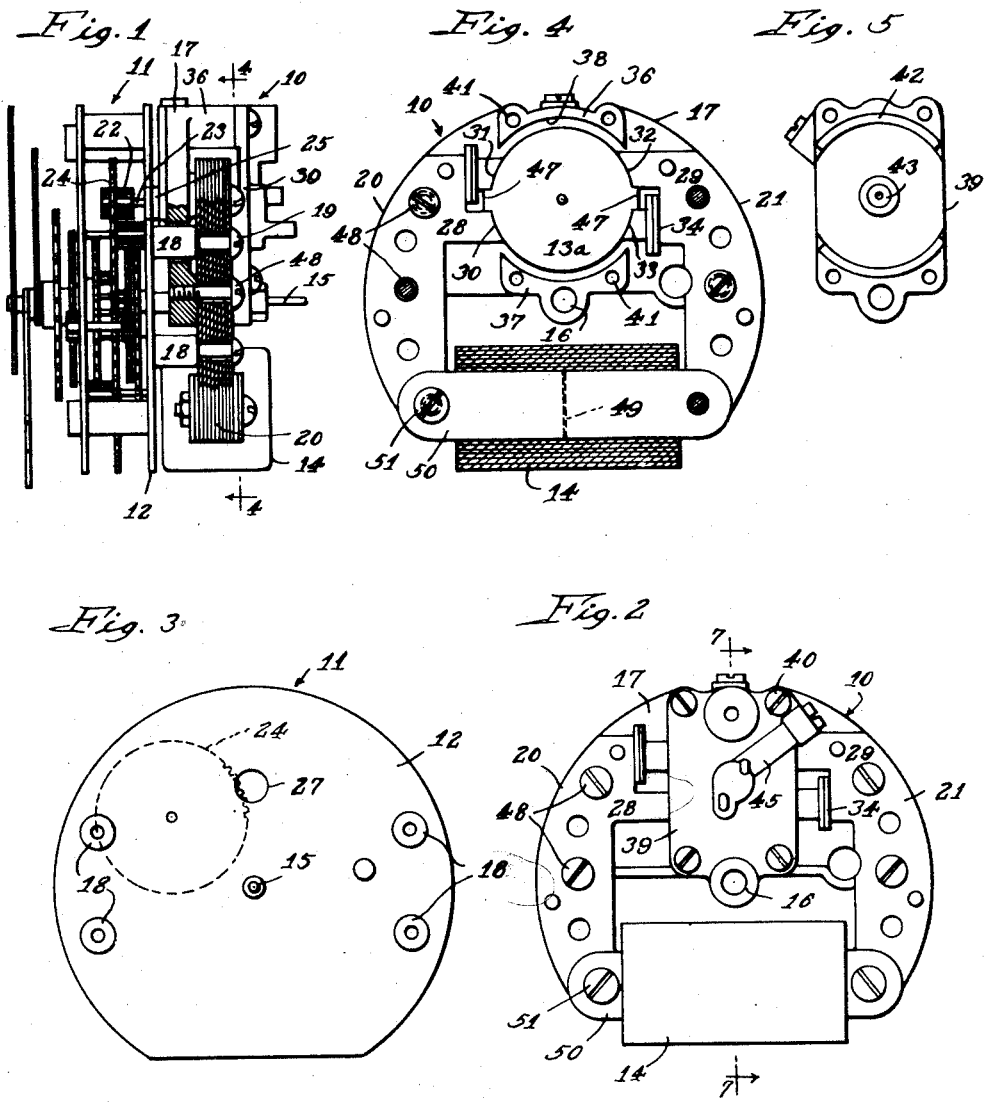

Oct. 16, 1934.  W. F. BISLEY  1,976,981
MOTOR FOR SELF STARTING ELECTRIC CLOCKS
Filed June 5, 1933  2 Sheets-Sheet 2
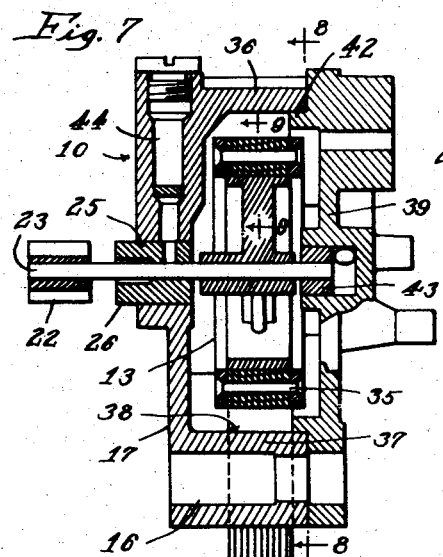
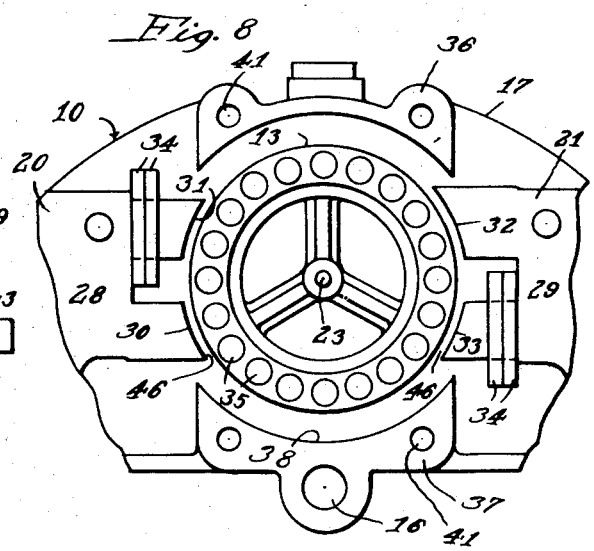
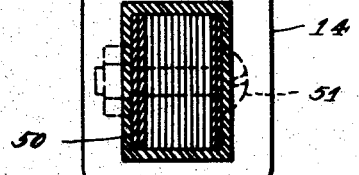
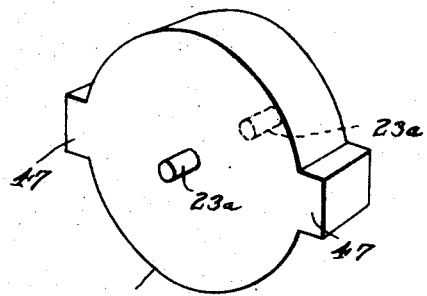
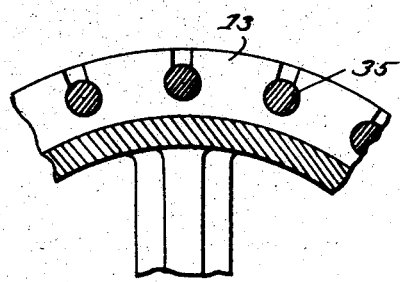

Patented Oct. 16, 1934

1,976,981

UNITED STATES PATENT OFFICE 1,976,981

MOTOR FOR SELF-STARTING ELECTRIC CLOCKS

William F. Bisley, Chicago, Ill., assignor to Chicago Flexible Shaft Company, Chicago, Ill., a corporation of Illinois Application June 5, 1933, Serial No. 674,282

11 Claims. (Cl. 172—275)

This invention relates to electric clocks and is particularly concerned with an improved self-starting motor therefor and method of mounting the same on the movement.

Among the more important objects of the invention may be enumerated the following—

(1) The provision of a two-pole, squirrel-cage, synchronous motor having shading coils on the bifurcated poles thereof so that there are four pole faces, two carrying the lagged flux and the other two the unlagged flux, one of the latter two being made wider in point of angularity with respect to the rotor than its companion just enough to positively insure starting but not enough to affect timing.

(2) The provision of a motor, in which the frame comprises a main body part constructed to substantially enclose the rotor between two diametrically opposed projecting portions thereof and has one of the rotor shaft bearings therein, the other bearing being provided in a cover part accurately located on the two projecting portions by arcuate pilots fitting on the arcuate internal surfaces of said projecting portions, whereby to insure accuracy in the location of the bearings in the assembling of the motor and thus insure a free running motor.

(3) The provision of a motor in which the stator laminations are made up in two sections adjustably mounted on the frame of the motor whereby to permit accurately setting the pole faces for the proper air gap by the insertion of a gauge plug in the place of the rotor in assembling, and then fastening the stator sections in place.

The above and other objects of the invention will be made to appear in the course of the following detailed description in which reference is made to the accompanying drawings wherein—

Figure 1 is a side view of a clock movement showing a motor constructed in accordance with my invention, a portion of the motor being shown in section to better illustrate the construction;

Fig. 2 is a rear view of the motor;

Fig. 3 is a rear view of the movement from which the motor has been removed;

Fig. 4 is a rear view of the motor with the cover shown in Fig. 5 removed and showing a gauge plug such as that appearing in perspective in Fig. 6, inserted in place of the rotor, as in the assembling of the stator sections, the view being generally in the plane of the line 4—4 of Figure 1;

Fig. 7 is a longitudinal section on the line 7—7 of Fig. 2, this view being on an enlarged scale;

Fig. 8 is a view on the line 8—8 of Fig. 7 showing the cover plate removed, and

Fig. 9 is an enlarged fragmentary section of the rotor on the line 9—9 of Fig. 7.

The same reference numerals are applied to corresponding parts throughout the views.

The motor of my invention, indicated generally by the numeral 10, is a two-pole, squirrel-cage, self-starting, synchronous motor designed to fit in the existing case of the movement indicated generally by the numeral 11. It is, therefore, no larger in diameter than the back plate 12 of the movement, and, in order to be accommodated in the case in the space behind the movement, is of the small thickness shown. To give an idea of the size of the motor without, of course, implying any limitation whatever on this invention, I might state that the flat, circular power unit formed by the motor 10 comes inside a diameter of 3⅛ inches. To meet these requirements, the rotor 13 and exciting coil 14 are on opposite sides of the center of the movement where the setting stem 15 extends through an opening 16 provided therefor in the motor frame 17. Four spacers 18 have screws 19 passed therethrough from the stator sections 20 and 21 to support the motor on the movement. The motor is accurately located before the screws 19 are tightened, it being important to have the drive pinion 22 on the rotor shaft 23 in proper meshing engagement with the driven gear 24 of the clock train. The way in which this accurate location is secured is to have the bushing 25, forming one of the rotor shaft bearings, project from the motor frame 17 to the extent shown in Fig. 7, whereby to provide a pilot 26, said pilot being adapted to have a snug fit in a hole 27 provided therefor in the back plate 12 of the movement in proper relation, of course, to the driven gear 24. Once the pilot is entered in the hole, the screws 18 can be tightened so as to make the power unit rigid with the movement and there is definite assurance that the movement will be driven smoothly and quietly as well as accurately. The power unit is suitable for use interchangeably on various clock movements by virtue of its construction and may, for example, be substituted for the motor of a manually started clock to make it self starting.

Positive self-starting of the motor 10 is secured in accordance with an important phase of my invention by making one of the main poles somewhat wider across its face than its companion so as to have the effect of unbalancing the magnetic flux in regard to the rotor just enough to make it start, that is, to assist the inductive torque to overcome the inertia of rest. Thus, referring to Fig. 8 in particular, wherein the 1 two poles 28 and 29 of the motor appear to best advantage, it will be seen that the poles are bifurcated to provide four pole faces 30—33, of which the faces 30 and 32 carry the main or unlagged flux and faces 31 and 33 carry the lagged flux, due to shading coils 34. The faces 30, 31 and 33 are of the same width, but the face 32 is wider than its companion 30 to the extent of approximately 3½ space degrees, by actual measurement angularly with respect to the rotor. Experiments conducted on a large number of models showed that this difference between the pole faces gives the desired unbalanced effect for positive starting without affecting timing, although it should be understood that the 3½ degrees difference might be increased or decreased to the extent of, say, one-half degree, without detriment. If the difference is carried too far, the unbalancing effect will surpass the timing effect of the iron (magnetic torque) which would bring the rotor to a higher speed than the sub-synchronous speed for which it was designed, because the inductive torque of the rotor will always tend to bring it to synchronous speed and it is only the fact that this inductive torque greatly diminishes as the motor gains speed that makes it possible for the magnetic torque to time the rotor, once it is brought near the sub-synchronous speed. The 3½ degrees difference is considered the best for all practical purposes; beyond this, the starting or timing characteristics (usually both) will be affected. It is, of course, generally recognized that the ordinary motor of the type in question without this difference in width of pole face has a decided tendency to lock, apparently due to the flux being set up uniformly across the rotor instead of only through certain peripheral portions, as in multi-polar designs. Naturally, such a motor that is not truly self-starting from any and all positions of rest of the rotor cannot be relied upon for use in a self-starting electric clock. The locking tendency is overcome with my special construction of the stator, as described above, and the motor is found to start positively from any and all positions of rest of the rotor, so that the motor is well adapted for the use intended. The rotor always starts and keeps proper time over a wide voltage range, tests having shown good operation from 70 to 230 volts, although the motor is designed to operate normally on 110 to 120 volt lines.

The sub-synchronous speed of the rotor selected depends, of course, upon the existing gear train of the movement in connection with which the motor is to be used. In the present case, a speed of 360 R. P. M. happens to have been chosen and, following the well known equation $$N = -\frac{P \times S}{K \times n}$$

it was determined that the proper number of rotor bars is twenty. There are, therefore, twenty bars 35 in the rotor 13. The pole faces 30—33 are designed so that there will never be more than two of these bars under a pole face (see Fig. 8). The amount of copper at 34 and 35 and the amount of iron in the rotor as well as the number of turns in the coil 14 are proportioned to obtain best results and give as much power as possible.
It is not deemed necessary to give the mathematical derivations relied upon in the designing of the different parts referred to since, in the main, they are well known to those skilled in this art.

The motor frame 17 is preferably a die casting, approximately semi-circular in form, as should be clear from Figs. 1, 2, 4 and 8, and has two projecting portions 36 and 37 on diametrically opposite sides of the rotor, more specifically above and below the same. These projecting portions, taken together with the opposed poles of the stator, substantially enclose the rotor from all sides. The interior surfaces of the projecting portions 36 and 37 are formed on arcs, as indicated at 38, truly concentric with the bearing 25 of the rotor shaft. In that way, a cover plate 39, which is adapted to be secured to the motor frame 17 by screws 40 entered in the threaded holes 41, is arranged to be accurately centered when the arcuate pilot portions 42 provided on the cover plate are entered between the projecting portions 36 and 37 in snug engagement with the arcuate surfaces 38. Thus, the bearing 43, provided in the center of the cover plate 39, is brought into exact concentricity with the other rotor shaft bearing 25 for free and easy, as well as accurate, running of the rotor. The bearings 25 and 43 are provided in the form of bushings of a special porous bearing material, a certain alloy having been perfected ideal for such purposes. Wells 44 and 45 provided on the frame 17 and cover plate 39, respectively, communicate with these bearings to deliver oil thereto and it is contemplated that with a single filling of these wells with oil at the time of assembling the motor, there is not apt to be any need for further supplying lubricant throughout the life of the power unit.

Referring to Figs. 4 and 6, I shall now explain how the stator sections 20 and 21 are assembled on the motor frame so that the rotor 13 will have a predetermined air gap 46 between its periphery and the pole faces 30—33. The pole faces are, of course, on arcs of exactly the same radius and, in order that there may be a uniform air gap, it is imperative that these faces be in exact concentricity with the rotor which, of course, is of a smaller radius. It is, furthermore, important that the pole faces be exactly at certain points of angularity with respect to the rotation of the rotor. I have found that the stator sections can easily be located in their proper positions with the use of a gauge plug 13a mounted in the bearings 25 and 43 in place of the rotor 13. As shown in Fig. 6, this plug has trunnions 23a projecting from opposite ends thereof to fit snugly in the bearings 25 and 43. This plug is of approximately the same radius as the pole faces 30—33 so as to fit neatly between the stator sections. The longitudinal ribs 47 provided on diametrically opposite sides of the plug fit snugly in the bifurcated poles 28 and 29 and thus serve to locate the pole faces at the proper angularity with respect to the rotor while the pole faces are disposed in exact concentricity with the rotor and at the proper radius with respect thereto. While the plug 13a is still in place and the stator sections properly engaged with it, four screws 48, entered freely through holes in the stator sections and threaded in the motor frame 17, are tightened so as to permanently fix the stator sections in their positions on the motor frame. The plug 13a can then be removed and the rotor 13 inserted. There is a gap indicated at 49 between the opposed ends of the stator sections inside the coil 14. Side plates 50 are, therefore, provided to complete the magnetic circuit from one stator section to the other. These plates have bolts 51 entered freely therethrough and through the stator sections so as to allow the latter to assume the proper relationship in the use of the gauge block 13a before the bolts are tightened to hold the stator sections in a fixed relationship.

It is believed the foregoing description conveys a good understanding of all of the objects and advantages of my invention. The appended claims have been drawn with a view to covering all legitimate modifications and adaptations.

I claim:

1. A motor of the class described, comprising a squirrel-cage rotor, and a magnetic field consisting of pole pieces having faces close to the periphery of the rotor, there being opposed companion pole faces of the same angular width carrying lagged flux and opposed companion pole faces carrying unlagged flux, one of the latter faces being of greater angular width than its companion whereby to unbalance the magnetic flux in the rotor enough to make it have a positive starting characteristic when the rotor is at rest but not enough to affect the synchronizing characteristic when the rotor attains synchronous speed.

2. A self-starting, non-locking, two-pole, synchronous motor comprising a squirrel-cage rotor having suitable bars in the periphery thereof in circumferentially spaced relation, opposed bifurcated pole pieces to provide four faces in closely spaced relation to the periphery of said rotor, and shading coils on one prong of each pole piece to produce lagged flux in two opposed companion faces, the other two opposed companion faces carrying unlagged flux, the two lagged flux faces and one of the unlagged flux faces being of a certain angular width with relation to the rotor and the remaining unlagged flux face being of a greater angular width with relation to the rotor, whereby the starting of the motor is facilitated.

3. A self-starting, non-locking, two-pole, synchronous motor comprising a squirrel-cage rotor having suitable bars in the periphery thereof in circumferentially spaced relation, opposed bifurcated pole pieces to provide four faces in closely spaced relation to the periphery of said rotor, and shading coils on one prong of each pole piece to produce lagged flux in two opposed companion faces, the other two opposed companion faces carrying unlagged flux, the two lagged flux faces being of equal angular width and the one unlagged flux face being of greater angular width than its companion, whereby to facilitate starting of the motor.

4. A motor as set forth in claim 2, wherein the added width on the unlagged pole face is approximately 3½ space degrees.

5. A motor as set forth in claim 3 wherein the difference in width between the unlagged pole faces is approximately 3½ space degrees.

6. In a motor construction, a rotor on a shaft, a frame having a bearing thereon receiving said shaft for support thereof from one side of the rotor, opposed pole pieces mounted on the frame and disposed in proximity with the periphery of the rotor to carry the magnetic flux in the operation of the rotor and also partially enclose the rotor, said frame having projecting portions in diametrically opposed relation to said rotor to enclose the remaining portions of the periphery of the rotor, and a cover plate mounted on the projecting portions of said frame to complete the enclosure of the rotor, said cover plate having a central bearing for reception of the aforesaid shaft for support of the rotor from the other side.

7. In a motor construction, a rotor on a shaft, a frame having a bearing thereon receiving said shaft for support thereof from one side of the rotor, opposed pole pieces mounted on the frame and disposed in proximity with the periphery of the rotor to carry the magnetic flux in the operation of the rotor and also partially enclose the rotor, said frame having projecting portions in diametrically opposed relation to said rotor to enclose the remaining portions of the periphery of the rotor, the inner surfaces of said projecting portions being arcuate in concentric relation to said rotor, and a cover plate mounted on the projecting portions of said frame to complete the enclosure of the rotor, said cover plate having a central bearing for reception of the aforesaid shaft for support of the rotor from the other side, and said plate also having a projecting pilot portion in concentric relation to the bearing and adapted to fit closely on the aforesaid arcuate internal surfaces, whereby to accurately center the central bearing in said plate with the bearing in said frame.

8. In a motor construction, the combination of a motor frame carrying a bearing adapted to receive a rotor shaft with a rotor thereon, opposed stator sections having poles provided with arcuate pole faces adapted to lie in concentric relation to the rotor, said sections being slidable on the motor frame to enable adjustment thereof to proper relationship to the rotor, a gauge plug having a diameter approximately equal to that of the rotor plus the air gap, means for removably centering the plug in the bearing, whereby to permit accurately locating the stator sections by engagement of the pole faces with the periphery of the plug, and means for fastening the stator sections to the frame.

9. A motor construction as set forth in claim 8, wherein the poles are bifurcated, one prong of each pole being adapted to receive a shading coil, the gauge plug having diametrically opposed ribs constructed for snug engagement between the prongs of the bifurcated poles, whereby to accurately locate the four pole faces in proper angular relationship to the rotor.

10. In a motor construction, the combination of a motor frame carrying a bearing, a rotor on a shaft received in said bearing, opposed stator sections having poles provided with arcuate pole faces adapted to lie in concentric relation to the rotor, said sections being slidable on the motor frame to enable adjustment thereof to proper relationship to the rotor, said stator sections having end portions projecting toward each other, an exciting coil surrounding said end portions, one or more plates extending through the coil alongside said end portions and slidable with respect to at least one of said stator sections, and means for securing the stator sections to the motor frame and the plates to the stator sections when the stator sections are properly adjusted with relation to the rotor.

11. A motor of the class described comprising a squirrel cage rotor, and a magnetic field consisting of pole pieces having faces close to the periphery of the rotor, there being opposed companion pole faces of the same angular width carrying lagged flux, and opposed companion pole faces carrying unlagged flux, one of the latter faces being approximately three and one-half space degrees wider than its companion for the purpose described.

WILLIAM F. BISLEY.